US008958817B1

(12) United States Patent
Murphy

(10) Patent No.: US 8,958,817 B1
(45) Date of Patent: Feb. 17, 2015

(54) WEIGHTED-DISTANCE SPATIAL INDEXING

(71) Applicant: Google Inc., Mountain View, CA (US)

(72) Inventor: Bruce Winston Murphy, Sydney (AU)

(73) Assignee: Google Inc., Mountain View, CA (US)

( * ) Notice: Subject to any disclaimer, the term of this patent is extended or adjusted under 35 U.S.C. 154(b) by 42 days.

(21) Appl. No.: 13/744,700

(22) Filed: Jan. 18, 2013

Related U.S. Application Data

(60) Provisional application No. 61/588,477, filed on Jan. 19, 2012.

(51) Int. Cl.
*G06F 15/16* (2006.01)
*H04W 4/02* (2009.01)

(52) U.S. Cl.
CPC ........................................ *H04W 4/02* (2013.01)
USPC ..................................... 455/456.1; 455/456.3

(58) Field of Classification Search
USPC ......... 455/550.1, 566, 571–573, 456.1, 456.3
See application file for complete search history.

(56) References Cited

U.S. PATENT DOCUMENTS

| | | | |
|---|---|---|---|
| 7,743,048 B2 | 6/2010 | Baldwin | |
| 7,801,897 B2 | 9/2010 | Egnor | |
| 2006/0106778 A1 | 5/2006 | Baldwin | |
| 2010/0174721 A1 | 7/2010 | Mou | |
| 2014/0114572 A1* | 4/2014 | Kalaboukis et al. | 701/527 |

FOREIGN PATENT DOCUMENTS

| | | |
|---|---|---|
| WO | 2005111787 A2 | 11/2005 |
| WO | 2007027608 A2 | 3/2007 |

OTHER PUBLICATIONS

Alexander Markowetz, Yen-Yu Chen, Torsten Suet, Xiaohui Long, Bernhard Seeger; Design and Implementation of a Geographic Search Engine; Eighth International Workshop on the Web and Databases (WebDB 2005), Jun. 16-17, 2005, Baltimore, Maryland; pp. 1-6.

* cited by examiner

*Primary Examiner* — Sam Bhattacharya
(74) *Attorney, Agent, or Firm* — Bracewell & Giuliani LLP

(57) ABSTRACT

Provided is a process of and apparatus for spatially indexing geographic items. The process may include obtaining geographic-item data identifying geographic items, the geographic location of each item, and an attribute of each item, wherein the geographic-item data identifies values of key-value pairs to be formed in a spatial index; obtaining a plurality of geographic-location keys each corresponding to a geographic area, the geographic-location keys identifying keys of the key-value pairs to be formed in the spatial index; and pairing each geographic-location key with an item among the geographic-item data. Pairing may be performed by: calculating distances between the geographic location of each of the items and the geographic-location key; weighting each of the distances based on the attribute of the item corresponding to that distance; and selecting the geographic item having the closest attribute-weighted distance as the item to be paired with the geographic-location key.

24 Claims, 7 Drawing Sheets

WEIGHTED-DISTANCE SPATIAL INDEXING

BACKGROUND OF THE INVENTION

1. Field of the Invention

The present invention relates generally to spatial searches and, more specifically, to spatial searches ranked according to weighted distances.

2. Description of the Related Art

Spatial searches, or searches in which the search results depend upon geographic location, have a variety of uses. For example, users may query a spatial-search engine for pizza parlors near the user's location (requesting, for instance "pizza near zip code 78701"), and a spatial search responsive to that query may return one or more pizza parlors ranked based on the distance between the pizza parlor and the reference location of zip code 78701. Similar queries may occur in scenarios in which a user is planning a vacation and searches for, for example, airports near a hotel in which the user has booked a room, or in scenarios in which content for a web page is selected based on geographic location, for example, an advertisement for a pizza parlor may be selected for display to a user based on the distance between the user's location (if the user opts to disclose their location) and the location of several pizza parlors seeking to advertise. Spatial searches, thus, are often performed when the relevancy of results depends on distance from some reference location.

In some cases, it can be helpful to rank search results based on both distance and other factors. For example, a user may search for airports near a reference location that is both relatively close to a small municipal airport and somewhat further from a large international airport. The large airport is more likely to be relevant to the searcher than the small municipal airport, even though the large airport is further away from the reference location about which the spatial search is based. Thus in this example, relevance may depend both on distance and size. To account for scenarios in which both distance and some other attribute affect the relevance of search results, some spatial searches are based on a weighted distance, or a value that is a function of both distance and some attribute or attributes. Weighted distances often cause farther geographic items to rank higher than closer geographic items when the weighting is heavy enough to overcome the difference in distance.

For a variety of reasons, spatial searches based on weighted distances are difficult to implement. Weighted-distance spatial searches often include evaluating a relatively large number of candidate items as potential search results because heavy weightings can cause relatively distant items to be responsive to a query. For instance, in the airport example, some spatial searches may include evaluating every airport on the continent in case an airport several thousand miles away has a particularly heavy weighting causing that airport to have the closest weighted distance. Evaluating a large number of candidate items often slows the search and diminishes the usefulness of spatial searches.

SUMMARY OF THE INVENTION

The following is a non-exhaustive listing of some aspects of the present techniques. These and other aspects are described in the following disclosure.

In some aspects, the present invention includes a process of spatially indexing geographic items. The process may include obtaining geographic-item data identifying geographic items, the geographic location of each item, and an attribute of each item, wherein the geographic-item data identifies values of key-value pairs to be formed in a spatial index; obtaining a plurality of geographic-location keys each corresponding to a geographic area, the geographic-location keys identifying keys of the key-value pairs to be formed in the spatial index; and pairing each location key with an item among the geographic-item data. Pairing may be performed by: calculating distances between the geographic location of each of the items and the geographic-location key; weighting each of the distances based on the attribute of the item corresponding to that distance; and selecting the geographic item having the closest attribute-weighted distance as the item to be paired with the location key. The process may also include storing the pairs of location keys and selected geographic items in a spatial index in memory.

Some aspects include spatial indexer having one or more processors and one or more memories storing instructions that when executed cause the processor(s) to perform the above-described indexing process.

Some aspects include a tangible machine-readable non-transitory medium storing instructions capable of causing a computer system to perform the above-described indexing process.

Some aspects include a process of searching for geographic items based on geographic locations of the items. The process may include receiving a query for an item of a type having a plurality of geographic locations, the query identifying a reference geographic location; retrieving from a index an item responsive to the query and corresponding to the reference geographic location, the index having been formed by the above-described process; and returning the item in response to the query.

Some aspects include a spatial search engine having one or more processors and one or more memories storing instructions that when executed cause the processor(s) to perform the above-described searching process.

Some aspects include a tangible machine-readable non-transitory medium storing instructions capable of causing a computer system to perform the above-described searching process.

BRIEF DESCRIPTION OF THE DRAWINGS

The above-mentioned aspects and other aspects of the present techniques will be better understood when the application is read in view of the following figures in which like numbers indicate similar or identical elements.

Figure 1:
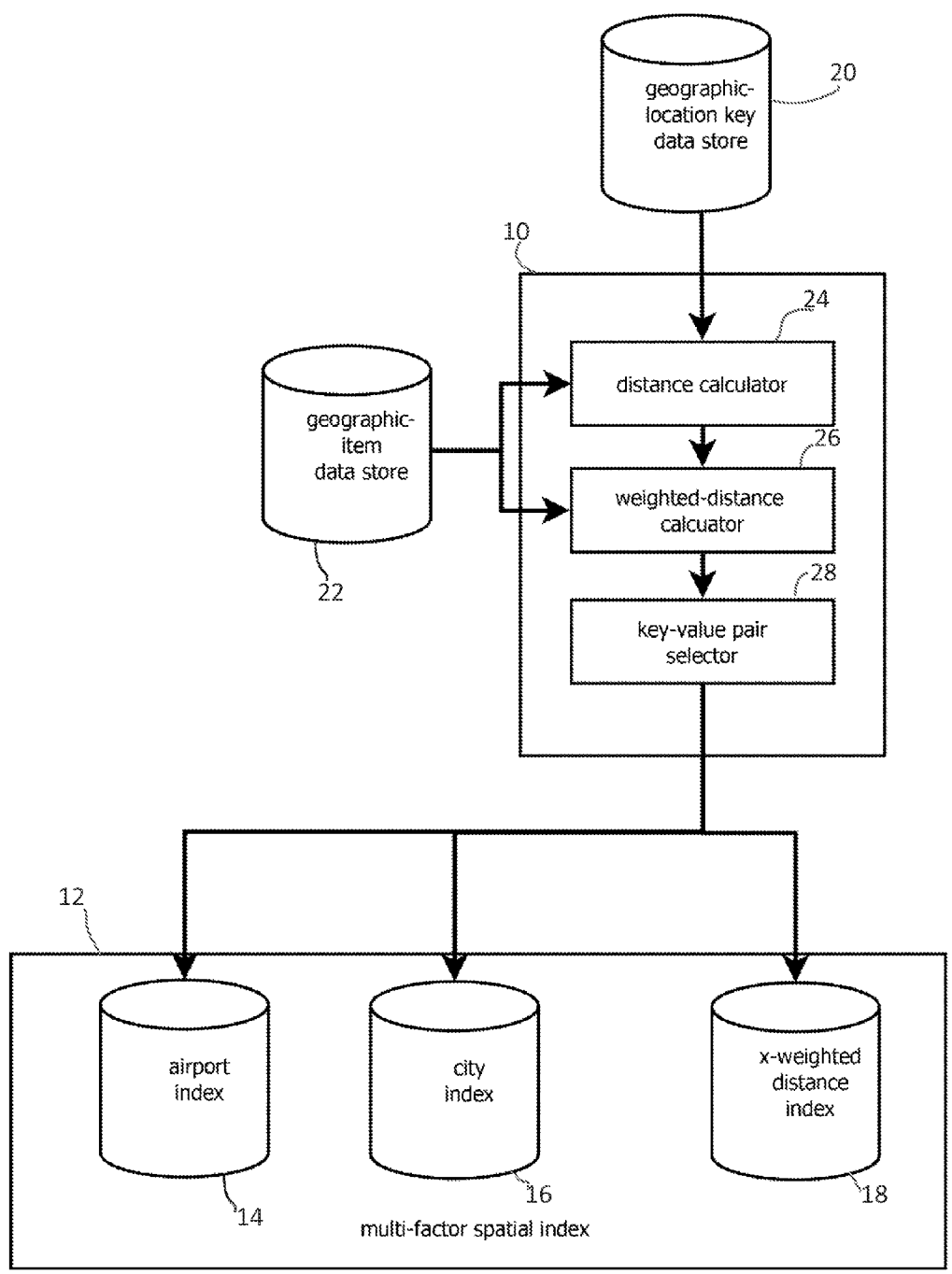
FIG. 1 shows an embodiment of a spatial indexer.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

FIG. 1 shows an embodiment of a spatial indexer 10 that forms indexes 12 for expediting weighted-distance spatial searches. The indexes may map a set of geographic locations about which a searcher may base a query to geographic items responsive to that query. For instance, geographic locations may be mapped to airports, cities, restaurants, or other items in the index. Which item is paired with a location may be based on a weighted distance between that item and the location, e.g., based on both the distance from the location to an airport and the capacity of that airport.

The spatial indexer 10 may be capable of forming multiple spatial indexes 14, 16, and 18, each reflecting different distance-weighting functions. For instance, index 14 may be a spatial index of airports based on distances weighted by airport capacity, and index 16 may be a spatial index of cites based on distances weighted by city population. (Three spatial indexes are shown, but other embodiments may have more or fewer.)

The indexes 12 may each include key-value pairs mapping geographic locations (e.g., potential reference points about which a search may be based) to geographic items (e.g., airports for index 14 and cities for index 16). The geographic item (or value in the key-value pair) paired with each geographic location (or key in the key-value pair) may be selected based on weighted distances to the item from the location. During a spatial search, geographic items responsive to the search may be retrieved based on keys corresponding to reference locations about which the search is based. Reference locations may be supplied by a searcher as part of a spatial search query.

By way of example, the depicted index 14 of FIG. 1 is an airport index having geographic-location keys, which may take a variety of forms, including zip codes, latitude and longitude coordinates, counties, states, or other descriptors of geographic locations, such as the examples described below with reference to FIGS. 3 and 4 designed to expedite searches and facilitate index compression. Each geographic-location key in the airport index 14 may be paired with one or more geographic items, in this case one or more airports, selected based on both the distance between the geographic-location key and the item and an attribute of the item, for example the capacity of the airport. Table 1 below shows one form this data might take, using zip codes as an example key value:

TABLE 1 example airport spatial index

| Geographic Key:<br>Zip Code | Geographic Item Value:<br>Airport Code |
|---|---|
| 77007 | IAH |
| 77008 | IAH |
| 77009 | IAH |
| 77033 | HOU |
| 77504 | HOU |

The example of table 1 is specific to a particular weighting formula for a particular category of geographic items: distance from zip codes weighted by airport capacity for the category airports. Other examples may apply different weighting formulas for airports or different weighting formulas for other categories of geographic items, for instance index 16 of the present embodiment is a spatial index of cities in which the values of the key-value pairs are the closest weighted-distance city to the geographic-location keys, with the distance weighted based on the population of the city, e.g., the product of the distance and the inverse of the log of the population.

The indexes 12 may take a long time to form relative to the time in which queries are executed, so some embodiments may form the index in advance, prior to using the index to perform spatial searches. Advantageously, once the index is formed, some embodiments may search relatively quickly, as the result of the search may be retrieved by first identifying a geographic-location key specified by the query, such as the location of the searcher or a location specified by the searcher. Then one of the indexes 12 may be identified as being relevant to the search (for example selecting the index 14 if the search relates to airports). Finally, some embodiments may look-up the geographic-location key within the relevant index and return the corresponding geographic item to the searcher. For instance, a query may request "airports near the 77009 zip code," thereby indicating that the airport index 14 is relevant to the search and that the geographic-location key is the zip code 77009. The result then is indicated, as shown above by Table 1, by identifying the value paired with the key of 77009.

Certain embodiments of the spatial indexer 10 may also be capable of forming indexes 12 that can be interrogated relatively quickly using techniques such as binary searches of the geographic location keys. For instance, some embodiments may sort the key-value pairs in the indexes 12 according to the keys, and the search engine described below with reference to FIG. 5 may identify the responsive geographic location keys within the index by repeatedly dividing the index in half and determining whether the division point is greater or less than the geographic-location key being sought until the key is found. Binary searches are expected to be faster for large indexes because the time consumed by binary searches scales with the log base 2 of the number of pairs in the index, in contrast to embodiments that potentially iterate over every item in the index, for which the time consumed scales linearly with the number of key-value pairs in the index.

Further, some embodiments of the spatial indexer 10 may be capable of forming indexes 12 that consume relatively little memory by compressing the indexes with run-length encoding. In many instances, a series of sequential geographic-location keys may be paired with the same geographic item. This tendency may be exploited to reduce the size of the indexes in memory. In some embodiments, the range of geographic-location keys paired with the same item may be specified by identifying the first geographic-location key in the range, the number of keys in the range, and the geographic item paired with each member of the range. For instance, in the example of Table 1 above, the first three rows of the table may be compressed by identifying the zip code 77007, the number three indicating that the next two zip codes sequential to 77007 are paired with the same airport, and the airport code IAH.

Forming the indexes, in some embodiments, may be expedited with a hierarchical partitioning of geographic areas. As described below with reference to FIG. 3, the levels of the partitioning may specify geographic areas with varying levels of granularity, e.g., a top level may specify a half of a hemisphere, a lower level may specify a quadrant of that half of the hemisphere, and so on to a bottom level of specificity. Indexing may be performed in order from coarser, higher-level partitions to finer, lower-level partitions to identify opportunities to avoid processing lower-level partitions of certain areas.

Opportunities to avoid processing lower-level partitions are described further below wither reference to FIG. 4. Generally, some higher-level, coarser-grained geographic partition will have a dominant weighted-distance result that precludes different results anywhere within the partition. For instance, upon determining that the Austin Bergstrom International Airport has the closest weighted-distance to the Austin Metropolitan Area and that the next closest result is relatively far, indexing may stop for finer-grained geographic-location keys (such as zip codes within the Austin Metropolitan Area), as it may be determined that those subregions have the same result based on the strength of the result for the larger area. The sufficiency of the result for this purpose at the higher level may be determined based on the diagonal distance across the higher-level, larger area: if the second-place item were moved the diagonal distance closer and the item still places second after weighting, it may be determined that the first place result prevails for all subpartitions at lower levels. Calculating results for large areas first is expected to reduce the number of calculations performed, as in many cases, every subset within those large areas will have the same result and evaluation of those subpartitions can be avoided.

The components and environment of the spatial indexer 10 is shown in FIG. 1. In some embodiments, the spatial indexer 10 may be coupled to both a geographic-location key data store 20 and a geographic-item data store 22.

The geographic-location key data store 20 may store the above-mentioned geographic-location keys. In some embodiments, the keys may include an identifier and bounding data indicating the geographic area corresponding to the key. For example, the key may be a zip code, and the data identifying the geographic area may be a set of vectors expressed in latitude and longitude identifying the boundaries of that zip code. In another example, the identifier may be an arbitrarily selected value, such as a count that is incremented over each member of a set of geographic areas, and the bounding data may be defined without regard to any political, administrative, or geographic subdivision, for instance without regard to where boundaries of cities, zip codes, or countries lie. For example, a geographic area may be divided into a grid, such as a rectangular grid having 1-meter by 1-meter unit cells. In some embodiments, the identifier may also defined the bounding area, for instance an identifier of a geographic area 5257 unit cells West and 23,000 unit cells South of an origin may be both identified by and have a geographic area defined by these coordinates.

In some embodiments, the identifier of the geographic-location keys may be a locality preserving identifier, such as a Z-order curve or a Hilbert curve, that serializes two or more dimensional data (e.g., location on the surface of the Earth) to a single dimension while preserving the locality of the identifiers. Preserving locality, in some embodiments, produces a single number that both identifies each partition of a geographic area and indicates which other partitions of geographic areas are near the identified geographic area. Further, in some embodiments, the geographic-location keys may be hierarchical, for example the geographic-location keys may be organized in a tree structure, with parent nodes of the trees corresponding to larger geographic areas, and child nodes of each parent node corresponding to sub geographic areas of that parent node. An example of such a hierarchical set of geographic-location keys, a quad tree in which each parent node has for child nodes, is described in greater detail below with reference to FIGS. 3 and 4, but other embodiments may hierarchically partition geographic areas differently, for example with a binary tree.

The geographic-item data store 22 may store geographic-item data, which may include data about a plurality of geographic items. The data about each item may include an identifier of the geographic item, a geographic location of the item, and one or more attributes of the item. For example, the geographic-items data store may store for each airport the airport code, the latitude and longitude of the airport, and the capacity of the airport. In some embodiments, the geographic-item data store may store data about a single category of geographic items corresponding to a single one of the indexes 14, 16, or 18, or the geographic-item data store 22 may store data about a plurality of different categories of geographic items, in which case the data about each geographic item may also indicate the category or categories corresponding to that item.

The data stores 20 and 22 and the indexes 12 may be stored in a variety of different physical and logical formats. In some embodiments, some or all of these bodies of data 14, 16, 18, 20, and 22 may be stored in a database, as attributes as of an object in an object oriented programming environment, as documents, or as a memory image, for instance. Further, some or all of these bodies of data 14, 16, 18, 20, and 22 may be stored on a hard disk, on a solid-state drive, in cache, read-only memory, or in random-access memory, for instance, either remote from the spatial indexer 10 (for example more than 10 miles away and accessible over the Internet) or locally, for example within a data center or within a single computing device.

The spatial indexer 10 may include a number of components for forming spatial indexes 12. In some embodiments, the spatial indexer 10 includes a distance calculator 24, a weighted-distance calculator 26, and a key-value pair selector 28. Each of these components 24, 26, and 28 may be separate computing devices, separate processes running on a single computing device, or separate modules of code running as one or more processes on one or more computing devices. While the modules 24, 26, and 28 are illustrated as separate functional blocks, in other embodiments, the software or hardware by which these modules 24, 26, and 28 are implemented may be intermingled or otherwise differently organized.

The functionality of the distance calculator 24, the weighted-distance calculator 26, and the key-value pair selector 28 are described in greater detail below with reference to FIG. 2, which illustrates a process 30 forming spatial indexes, such as the spatial indexes 12 of FIG. 1. Embodiments of the process 30, however, are not limited to the operation of the spatial indexer 10, as the techniques illustrated are applicable in other environments.

The process 30, in some embodiments, begins with obtaining geographic-item data identifying items, the geographic location of each item, and an attribute of each item, as illustrated by block 32. The geographic-item data may be obtained by the distance calculator 24 of FIG. 1 from the geographic-item data store 22 also of FIG. 1. In some embodiments, the obtained geographic-item data may be data describing a plurality of geographic items, such as data describing airports, cities, tourist attractions, bus stops, train stations restaurants, gas stations, businesses, rivers, lakes, mountains, locations of friends, locations of colleagues, locations of employees, or locations of events (such as festivals, concerts, and the like). The geographic-item data may be obtained by the distance calculator 20 by transmitting a request for all geographic-item data relating to a particular category to the geographic-item data stored 22, which may respond to the request by transmitting the responsive data to the distance calculator 24. In other embodiments, the geographic item data may be transmitted item-by-item to the distance calculator 24 as needed.

The items may be identified by a name of the item or some other identifier, such as an item key-value by which additional data about the item, including its name, may be retrieved from another table, document, or object. The geographic location of the item may be expressed in a variety of formats. In some embodiments, the geographic location may be a geographic area or may be a point. The location may be expressed as an absolute location, for example a latitude and a longitude, or a relative location, such as a distance and a direction from a point of reference like a landmark. The attribute of each item may be a single attribute, or multiple attributes may be obtained. For example, as noted above the attribute may be a capacity of an airport or a population of the city. Other examples include a price of gas at a gas station, a number of annual visitors at a tourist attraction, a cost of a bus ticket for bus stops, a category of food or reviewer rating of restaurants, a volumetric flow rate of a river, a size of a lake, a height of mountains, or a predicted user affinity for an event based on previous events a user has attended. In some embodiments, as illustrated in FIG. 1, the attributes and item identifiers may also be obtained by the weighted-distance calculator 26 for calculating weighted distances.

Next in the present embodiment of process 30, a plurality of geographic-location keys may be obtained, as indicated by block 34. In some embodiments, the plurality of geographic-location keys may be obtained by the distance calculator 24 from the geographic-location key data store 20 of FIG. 1. The keys may be obtained, for example, by the distance calculator 24 by transmitting a request for geographic-location keys to the key data store 20, which may respond to the request by transmitting the group geographic-location keys responsive to the request to the distance calculator 24. As noted above, the keys may include an identifier of a geographic location, such as a geographic area, and data indicative of the boundaries of that geographic area. Further, as noted above and described in greater detail below with reference to FIGS. 3 and 4, the keys may be hierarchical and the identifier may correspond to the geographic location of the keys. In some embodiments, the geographic-location keys may include geographic-location keys corresponding to the entire planet (which may be Earth or another planet for which information about the distribution of geographic features is available) or a subset of the planet, such as a hemisphere, a continent, a country, a state, or a city. Further, all of the keys to be used in process 30 may be requested at once, or the keys may be requested as needed. In some embodiments, the keys may not be stored and may be generated algorithmically as needed, e.g., by incrementing a counter through a range of keys.

In this embodiment, the process 30 further includes selecting one of the obtained geographic-location keys, as indicated by block 36. Selecting one of the keys may include referencing and incrementing a counter by which the process 30 iterates through a list of the geographic-location keys or mapping a process for performing the subsequently described steps of the process 30 on to a set of the obtained geographic-location keys, for example in a functional programming environment. In some embodiments, a plurality of location keys may be selected, and the steps described below may be performed generally concurrently or during overlapping time periods, for example by different processes on a single machine, by different cores of a multicore processor, or by different computing devices in a distributed computing environment. The location keys may be selected by the distance calculator 24 described above with reference to FIG. 1.

Next, in this embodiment, distances may be calculated between the location of the selected location key and the locations of each of the items described by the obtained geographic-item data. Distances may be calculated between a location key corresponding to the zip code 77007 (e.g., relative to a centroid of the area encompassed by the zip code) and each airport within an area being indexed, such as each airport on the planet, on a continent, within a country, with the state, or within a city. Each calculated distance may be stored in memory and associated with the corresponding one of the geographic items to which the distance was calculated, for instance each airport may be stored with a geographic distance to the selected location key. The distances of step 30 may be distances experienced as crows fly (that is, distances calculated without regard to obstacles or the availability of transport) or the distances may be distances traveled via selected modes of transport, such as the shortest distances along roads, trails, bus routes, or by rail. In some embodiments, the distances of block 38 may be calculated by the distance calculator 24 mentioned above with reference to FIG. 1.

In some embodiments, the calculated distances may be weighted based on the attribute of each item corresponding to that distance, as indicated by block 40. For instance, the distance to each airport may be weighted based on the capacity of that airport, the distance to each city may be weighted based on the population of that city, the distance to each restaurant may be weighted based on user reviews of that restaurant, or the distance to gas stations may be weighted based on the price of gas at that gas station. In some embodiments, weighting may including applying both the distance and the attribute to a function that outputs a single cardinal or ordinal value as a weighted distance. The function may accept multiple attributes in some embodiments. For example, the weighted distance may be a function of distance, the capacity of an airport, the number of airlines servicing airport, and traveler reviews of an airport. The parameters of the weighting function may be combined in a variety of ways. For instance, the weighted distance to a city may be the ratio of the log of a city population and the distance to that city. Or the weighted distance to an airport may be the product of the inverse of an airport capacity and the distance to that airport. In some embodiments, the weighting of step 40 may be performed by the weighted-distance calculator 26 shown in FIG. 1. A plurality of weighted distances may be calculated, such as one for each distance calculated in step 30, and the weighted distances may be stored in memory and associated with the corresponding geographic items.

Next, in some embodiments, the geographic item having the closest attribute-weighted distance may be selected to be paired with the selected location key, as indicated by block 42. In some embodiments, the process 30 may include iterating through each weighted distance calculated in step 40 to identify the smallest weighted distance in the set. The selection of step 42 may be performed by the key-value pair selector 28 illustrated in FIG. 1. In some embodiments, a single geographic item may be selected for each selected key, or in some embodiments, multiple geographic items may be selected for each key, such as each geographic item within a threshold weighted distance, or each geographic item within a threshold rank, such as the five closest weighted-distance geographic items. Each key-value pair selected in step 42, in some embodiments, may also be associated with the geographic distance for the selected item calculated in step 38 and the weighted distance for that geographic items calculated in step 40.

Figure 2:
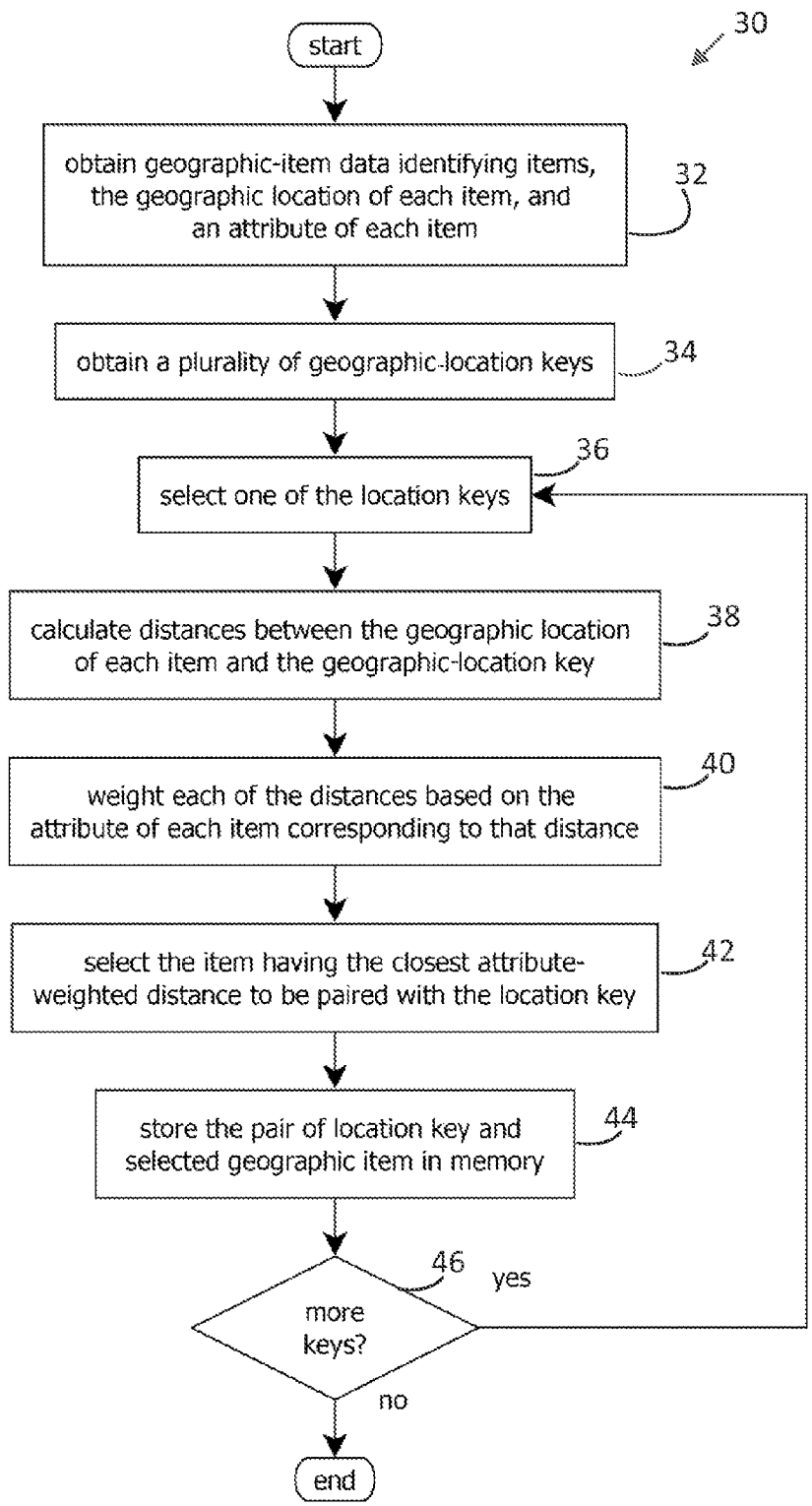
FIG. 2 shows an embodiment of an indexing process performed by the spatial indexer of FIG. 1.

The selected key-value pairs may be output to the indexes 12 described above with reference to FIG. 1 for storage, as indicated by block 44 of FIG. 2. The key-value pairs may be expressed in a variety of data structures. For example, the key-value pairs may be stored as a tuple (each member of which having a location key and an associated item value) sorted according to key to facilitate binary searches based on the key. In another example, the key-value pairs may be stored as a prefix tree structured according to the key, for instance more significant digits (e.g., bits) of the key may correspond to parent nodes of the tree and less significant digits of the key may be appended to node identifiers as the tree progresses through child nodes to leaf nodes. In some embodiments, the key-value pairs may be stored in a binary search tree, the nodes of which may be organized such that each parent node has two child nodes, with a left child nodes being, or linking to, keys smaller than the parent node, and the right child node being, or linking to, keys larger than the parent node's key identifier. Other embodiments may map geographic-location keys to geographic items in other types of associative arrays.

As illustrated by block 46, the process 30, in some embodiments, includes determining whether all of the geographic location keys have been selected. Upon determining that at least some keys have not yet been selected, the process 30 returns to step 36, and a geographic-location key among those that have not yet been selected may be selected. Alternately, upon determining that all geographic-location keys have been selected, the process 30 may end.

The process 30 may be repeated for each index 14, 16, and 18 of FIG. 1. In some embodiments, the process 30 of FIG. 2 may be repeated for each weighting function by which different geographic items are to be evaluated. For example, multiple airport indexes may be formed, one index for a weighting based on capacity, one index for a weighting based on the number of airlines serving the airport, and one index based on traveler reviews of the airport. The process 30 may be repeated for the same weighting function at different times to account for changes that occur over time, such as changes in attributes or locations. In some embodiments, the process 30 may be repeated periodically, for example daily, weekly, monthly, or yearly.

Figure 3:
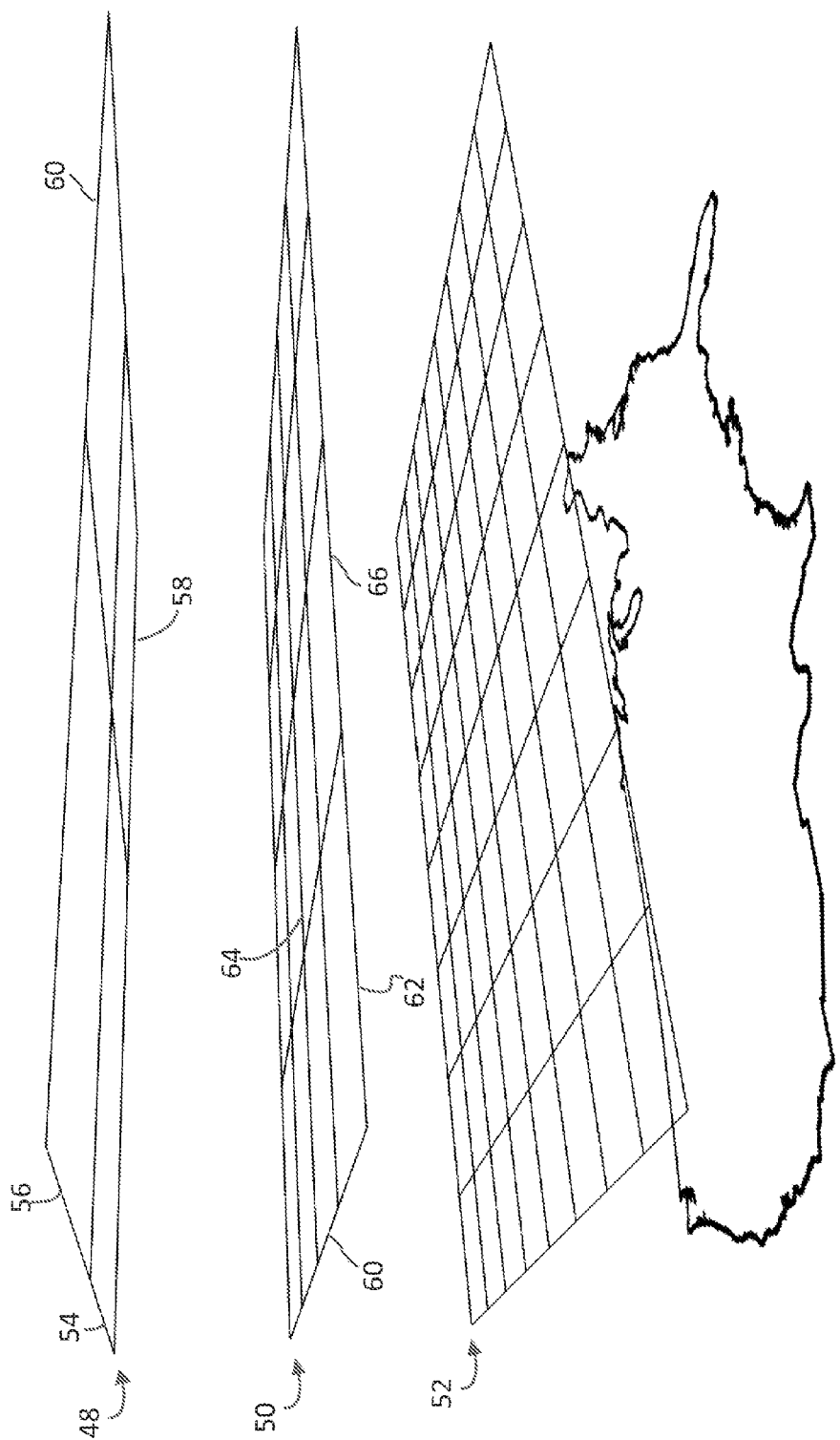
FIG. 3 shows an embodiment of a hierarchical mapping of geographic-location keys that may be used by the spatial indexer to identify geographic locations.

FIG. 3 illustrates a hierarchical arrangement of geographic-location keys by which a geographic area, such as a country, continent, or the planet, may be partitioned and indexed in accordance with the above described techniques. In the embodiment of FIG. 3, three hierarchical levels 48, 50, and 52, each having a different granularity of partition, are illustrated. In this embodiment, the top hierarchical level 48 partitions the United States into four generally or exactly rectangular (e.g., square) quadrants 54, 56, 58, and 60. The next lower hierarchical level of geographic-location keys 50 partitions each of the quadrants of the higher-level 48 into four sub quadrants. For example, the partition 56 is subdivided into geographic-location keys 60, 62, 64, and 66. Each of the partitions of level 50 is further subdivided into four sub partitions in level 52. Within each level 48, 50, and 52, the partitions may all each have the same unit size and may all be generally rectangular areas. Some embodiments may include both higher and lower levels than illustrated in FIG. 3, which may partition larger areas, such as the entire planet, into higher resolution specifications of geographic areas, such as geographic areas of approximately (or smaller than) 1 meter squared, 2 meters squared, 4 meters squared, 8 meters squared, 16 meters squared, 32 meters squared, 64 meters squared, or 10 kilometers squared. References to partitions of FIG. 3 (e.g., partition identifiers, or geographic-location key identifiers) may be stored in a quad tree data structure. Each parent node of the tree may correspond to one partition in a given level and have four child nodes, each of which may correspond to one of the four sub-partitions of the parent node's geographic area.

The illustrated hierarchical partitioning of geographic areas facilitates certain techniques for expediting the formation of indexes. One such technique is illustrated by FIG. 4, which illustrates four levels of portions of a quad tree, with levels two, three, and four corresponding to the levels 48, 50, and 52 of FIG. 3 and level 1 corresponding to a parent node of the entire tree, in this example the entire United States. Each box within a level represents one partition within that level, and each box of levels one, two, and three each have four child nodes, though not all child nodes are shown for all boxes. In this example, node 68 represents an area that is subdivided into quadrants represented by nodes 70, 72, 74, and 76. The nodes of the bottom level, level 4, may be referred to as leaf nodes. The letters A-D within some of the boxes indicate the geographic item with which the geographic location key of that node is paired, and empty boxes indicate nodes for which child nodes are paired with multiple geographic items.

In some embodiments, the process 30 described above with reference to FIG. 2 may be performed in order from higher-level partitions (corresponding to larger areas) to lower-level partitions (corresponding to smaller sub-partitions of those larger areas) in order to identify instances in which the result at a higher-level partition obviates the need to evaluate lower-level partitions. In some embodiments, the process 30 may be performed by selecting node 78 first, then nodes 68, 80, 82, and 84, followed by nodes in level 3, and then nodes in level 4, to the extent the child nodes need to be evaluated given the strength of the result for the parent node. Empty boxes in FIG. 4 indicate instances in which the strength of the result at a parent node is insufficient to preclude different results for child nodes.

Figure 4:
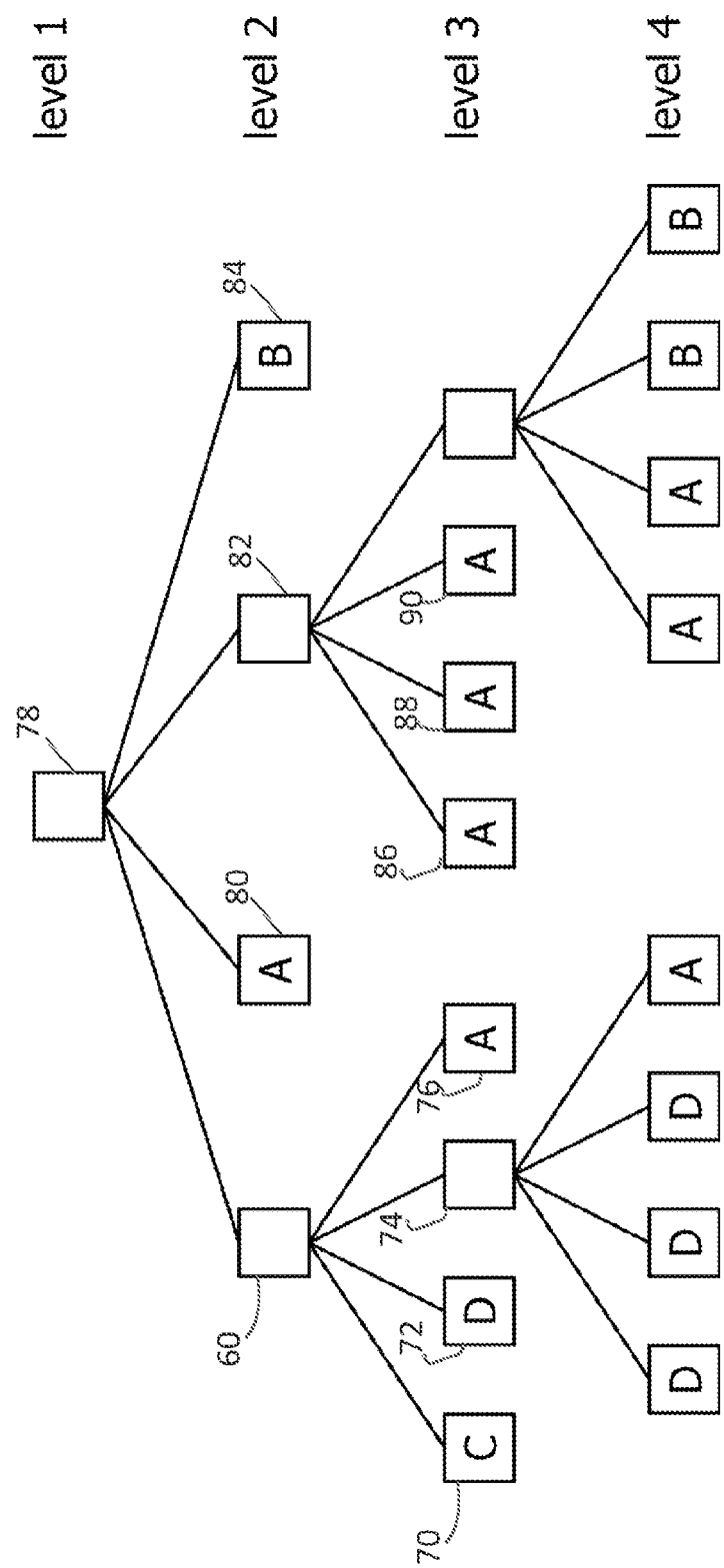
FIG. 4 shows an embodiment of a process for identifying geographic-item values to be paired with the location keys of FIG. 3 to form a spatial index.

For example, in FIG. 4, a geographic item represented by the letter A has a weighted distance for the geographic location key corresponding to node 80 that is sufficiently close that none of the children nodes of node 80 is paired with a different geographic item. In some embodiments, after determining that a geographic item is paired with a geographic-location key of a parent node, a delta weighted distance may be calculated to determine whether the process 30 will be performed for the child nodes. The delta weighted distance may be calculated for the parent node by adding a distance across the geographic area of the parent node, such as a diagonal of a rectangular area or a maximum distance across the geographic area, to the geographic distance between the parent node and the selected geographic item for that parent node and, then, calculating a delta weighted distance based on the sum. This delta weighted distance, using the sum of the distance and the diagonal, for example, may then be compared against the next closest weighted distance for the parent node.

Upon determining that the delta weighted distance is still closer than the next closest weighted distance for the parent node, in response, the process 30 may not be repeated for any child nodes of that parent node, as even accounting for the distance across the parent node, the same geographic item prevails. Alternatively, upon determining that the delta weighted distance is not closer than the next closest weighted distance for the parent node, in response, the process 30 may proceed to select the child nodes of the parent node and the same determination may be performed to ascertain whether lower-level nodes should be evaluated. By identifying instances in which the geographic item selected for the parent node is selected by such a large margin that no child nodes could have a different result, the process 30 may be expedited by reducing the number of iterations. For example, in FIG. 4, processing of child nodes may be avoided at nodes 70, 72, 76, 84, 86, 88, and 90.

In some embodiments, the partitioning of geographic areas illustrated in FIG. 3 may correspond to a quad tree data structure, and each node in the tree, and the geographic area corresponding to that node, may be associated with an identifier. The identifier, in some embodiments, may be a locality preserving value, such as a three-dimensional space-filling curve by which a one-dimensional value may be calculated for each partition such that nearby partitions have similar values. In some embodiments, the identifiers of each node in the quad tree may be Z-order values or Hilbert-curve values, for example, that specify two-dimensional geographic areas at varying levels of specificity with a one-dimensional value.

In some embodiments, the key identifier may be a binary value having a number of digits corresponding to the number of hierarchical levels of geographic partitioning. For instance, in the embodiment of FIG. 3, which has three levels, the key identifiers may be a six-bit binary number, that is, expressed with six binary digits. In some instances, the number of digits may be two times the number of levels. Some embodiments may express key identifiers as an 8, 16, 32, 64, 128, 256, or higher bit number.

In some embodiments, the more significant digits of the key identifier may correspond to higher hierarchical levels of the geographic partitioning. For example, the two most significant digits of a key identifier may indicate which of the four partitions in level 48 of FIG. 3 includes a geographic area corresponding to that key identifier. In some embodiments in which geographic key identifiers are Hilbert curve values, partition 56 may correspond to most significant bits of 01, partition 60 may correspond to most significant bits of 10, and partition 58 may correspond to most significant bits of 11. And in some of these embodiments, the lower-level partition key identifiers may be assigned based on a similar pattern: partition 60 in level 50 may be assigned a key identifier 0100, partition 62 may be assigned a key identifier 0101, partition 66 may be assigned a key identifier 0110, and partition 64 may be assigned a key identifier 0111, with the two more significant bits corresponding to the parent node and these two less significant bits corresponding to the quadrants of the child nodes. This pattern may be repeated to assign key identifiers for the lower-level of partitions 52 by appending two additional less significant bits. In other embodiments, the key identifiers may be assigned according to other space filling curves, such as a Z-order curve in which partition 54 of level 48 may be assigned a key identifier of 00, partition 58 may be assigned a key identifier of 01, partition 56 may be assigned a key identifier of 10, and partition 60 may be assigned a key identifier of 11, with a similar pattern repeating for sub partitions by appended less significant bits indicative of the sub partition. Other embodiments may encode key identifiers with a base four number (e.g., 0, 1, 2, and 3), and each level may specify one digit of the identifier.

Identifying geographic-location keys with locality preserving values is expected to facilitate compression of the indexes 12 of FIG. 1. Adjacent geographic areas are expected to be frequently paired with the same geographic items, as adjacent geographic areas have similar distances to those geographic items. Consequently, ranges of identifiers of the geographic-location keys are expected to identify keys paired with the same geographic item, particularly in embodiments in which the key identifiers are locality preserving values. The ranges, or consecutive sequences of the key identifiers, may be compressed with run-length encoding by, for example, identifying a member of the range, such as a first value in the range or a last value in the range, and a number of members of the range. In other embodiments, the index may be compressed with other forms of compression. An example of one way in which an index may be compressed with run-length encoding is depicted below with Table 2:

TABLE 2

| Index compressed with run-length encoding | | |
|---|---|---|
| Starting Key Identifier | Number of Keys in Range | Airport Paired with Range |
| 000000 | 27 | IAH |
| 011011 | 18 | HOU |
| 101101 | 18 | AUS |

Accordingly, some embodiments may compress the indexes with run-length encoding, thereby potentially reducing the amount of memory consumed by each index. And as illustrated by FIGS. 3 and 4, some embodiments may form indexes relatively quickly by pairing larger partitions of geographic areas with geographic items before pairing sub partitions to avoid processing some sub partitions by identifying instances in which the results for a larger partition precludes a different result for any sub partitions. While not every embodiment provides one or both of these advantages, both advantages facilitate the use of a relatively large number of indexes, as may occur in embodiments in which a relatively large number of different distance weighting may be applied to a relatively large number of different categories of geographic items.

Figure 5:
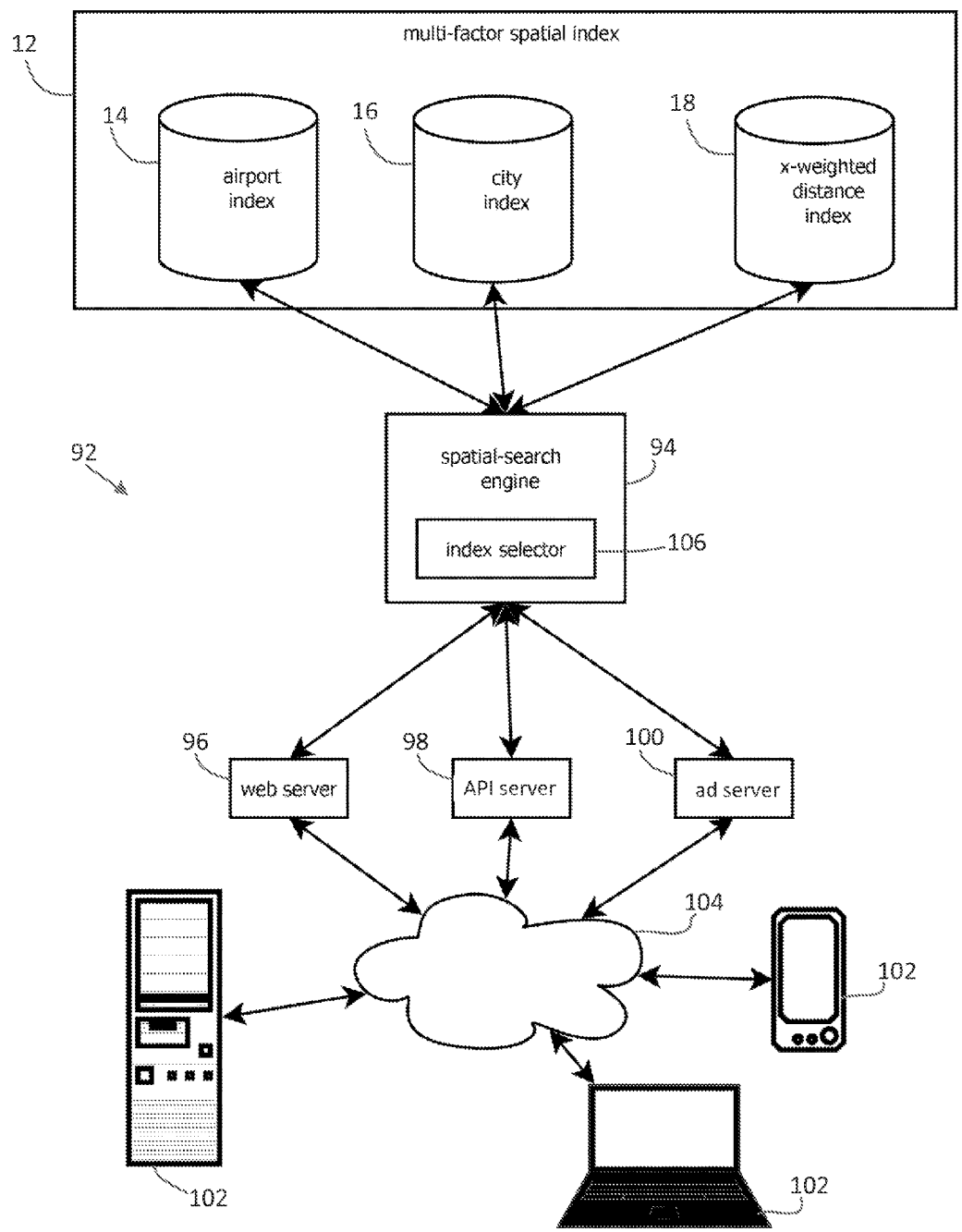
FIG. 5 shows an embodiment of a spatial-search engine.

The indexes described above may be interrogated by some search engines to perform spatial searches. FIG. 5 illustrates such a system 92 for executing weighted-distance spatial searches. The system 92, in some embodiments, includes the spatial indexes 12 described above with reference to FIG. 1, a spatial-search engine 94 coupled to a web server 96, an application programming interface (API) server 98, and an ad server 100 for serving advertisements to other web servers. Each of these servers may be connected to various computing devices 102 via a network 104, such as the Internet. In some embodiments, the spatial-search engine 94 may include an index selector 106 capable of selecting among the indexes 12 based on the query.

To initiate a search, one of the computing devices 102 may output queries or other requests answerable with a weighted-distance spatial search to one of the servers 96, 98, or 100, and the servers 96, 98, or 100 may transmit data indicative of the received query to the spatial-search engine 94.

Upon receiving the query, the index selector 106 may select an index 14, 16, or 18. For example, a query relating to airports, such as a query including the text "airport," "flights," or an airline name, may signal that the airport index 14 is responsive to the search. In other embodiments, data indicative of the appropriate index 12 may be identified explicitly by the query. For example, a server constructing a webpage may determine based on session state data that a user is interested in traveling to a particular geographic region, and the server may transmit a query to the API server 98 querying cities near that geographic region, thereby implicating the city index 16.

The query may also include other data, including data indicative of a geographic reference location about which the search should be based, such as the location of a user submitting the query, or a location indicated by other session state data. Further, in some embodiments, the query may include data indicative of a mode of transport, such as vehicle, bus, train, biking, or walking transport. In some embodiments, multiple indexes may be maintained for different modes of transport for a given distance weighting formula, and the index may be selected also based on the identified mode of transport, such as a biking index for airports or a bus index for airports, each with a distance weighted by airport capacity and based on distances experienced through a different mode of transport.

After identifying the appropriate index 14, 16, or 18, the spatial-search engine 94 may look up the location identified by the query within the index, for example by identifying the geographic-location key within the index corresponding to that reference location, and the geographic item or items paired with that geographic-location key may be returned to the entity that submitted the query via the spatial-search engine 94. In some embodiments, the indexes may be structured to expedite the identification of a sought geographic-location key. For example, the indexes 12 may each be sorted based on the geographic-location key, and the indexes 12 may be searched with a binary search. In some embodiments, the indexes 12 may be stored in a binary search tree or a prefix trie to expedite searches for a particular geographic-location key.

Figure 6:
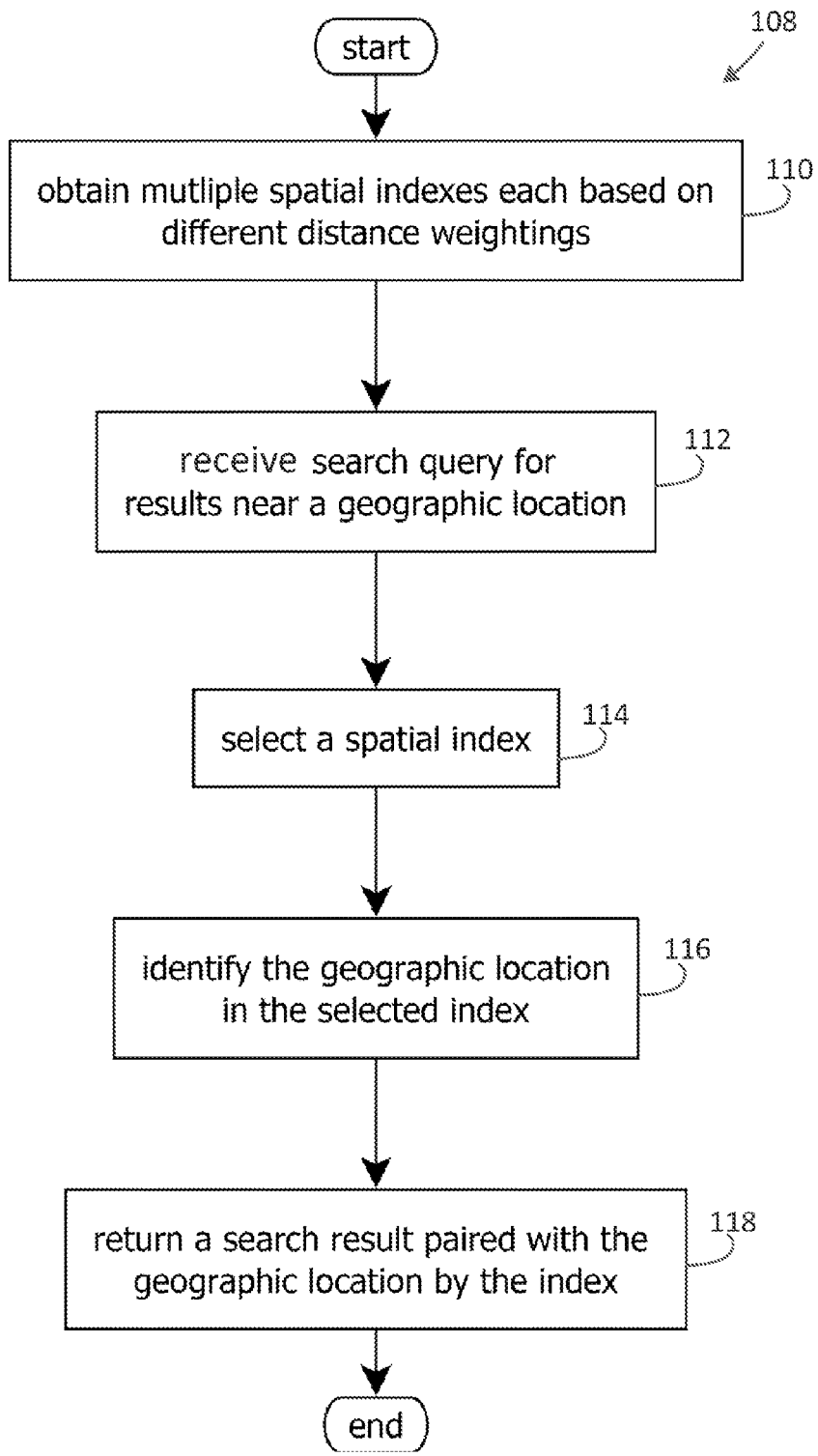
FIG. 6 shows an embodiment of a process for searching that may be performed by the spatial-search engine of FIG. 5.

The operation of the system 92, in some embodiments, is illustrated by FIG. 6, which shows an embodiment of a process 108 for performing spatial searches. Applications of the process 108, however, are not limited to the system 92 of FIG. 5, and some embodiments of the process 108 may be executed in other environments.

In some embodiments, the process 108 includes obtaining multiple spatial indexes each based on different distance weighting, as illustrated by block 110. In some embodiments, obtaining multiple spatial indexes may include obtaining the indexes 12 produced by the system of FIG. 1. The process 108, in some embodiments, also includes receiving a query for results near a geographic location, as illustrated by block 112. The query may identify a geographic-location key within one of the obtained spatial indexes, either by explicitly specifying the geographic-location key, or by including data indicative of the appropriate geographic-location key, for example a zip code or city name by which a key identifier may be retrieved from a table indicating which zip code or city corresponds to the partition identified by each key identifier. The query may also include data indicative of the appropriate spatial index, which may include data that explicitly identifies the spatial index, or data correlated with the index, such as known terms related to categories of geographic items mapped by one or more of the indexes 12. The query may be received from a user requesting information about geographic items near a particular geographic reference location, or the search query may be received from a computing device constructing content for some other purpose, such as a computing device selecting an advertisement to be display to a user based on a geographic location.

Next, in some embodiments, the process 108 may include selecting a spatial index, as indicated by block 114. Selecting a spatial index may be performed by the index selector 106 described above with reference to FIG. 5. In some embodiments, the spatial index may be selected based on a spatial index explicitly identified or based on spatial indexes correlated with other aspects of the query, such as keywords.

Some embodiments of the process 108 may also include identifying the geographic location about which the searches are based in the selected index, as indicated by block 116. Identifying the geographic reference location may include performing a binary search for the corresponding geographic-location key within the selected index. For instance, the selected index may be sorted by location key identifier (e.g., in advance of the query), and the selected index may be divided in half, with one half having geographic-location key identifiers greater than the division point and the other half having geographic-location key identifiers smaller than the division point. One of the two partitions may then be selected based on whether the geographic-location key being sought is smaller or larger than the division point, selecting the half in which the geographic-location key being sought resides (or if the division point equals the key identifier, the search is complete). The partitioning and selection step may be repeated for the selected half of the index until the geographic-location key being sought is found.

Next, in some embodiments of process 108, a search result may be returned by identifying the geographic item or items corresponding to the geographic location in the index, as illustrated by block 118. In some embodiments, returning the search result may include returning an identifier of the geographic item, a weighted-distance to the geographic item from the geographic reference location, and an un-weighted distance to the geographic item from the geographic reference location.

Embodiments of the process 108 and the system 92 are expected to be capable of answering spatial queries in which the relevance of results depends both on distance and some other attribute of the candidate search results. Making searches responsive to both distance and other factors is expected to yield more relevant searches in certain applications, as often distance is not the sole factor considered when selecting among geographic items. Some of the techniques described above are also expected to form indexes relatively quickly and form indexes that consume relatively little memory. Further, the indexes 12 are expected to facilitate relatively fast searches based on weighted distances, which is expected to improve the experience of the end-user receiving content upon which the spatial searches based.

Figure 7:
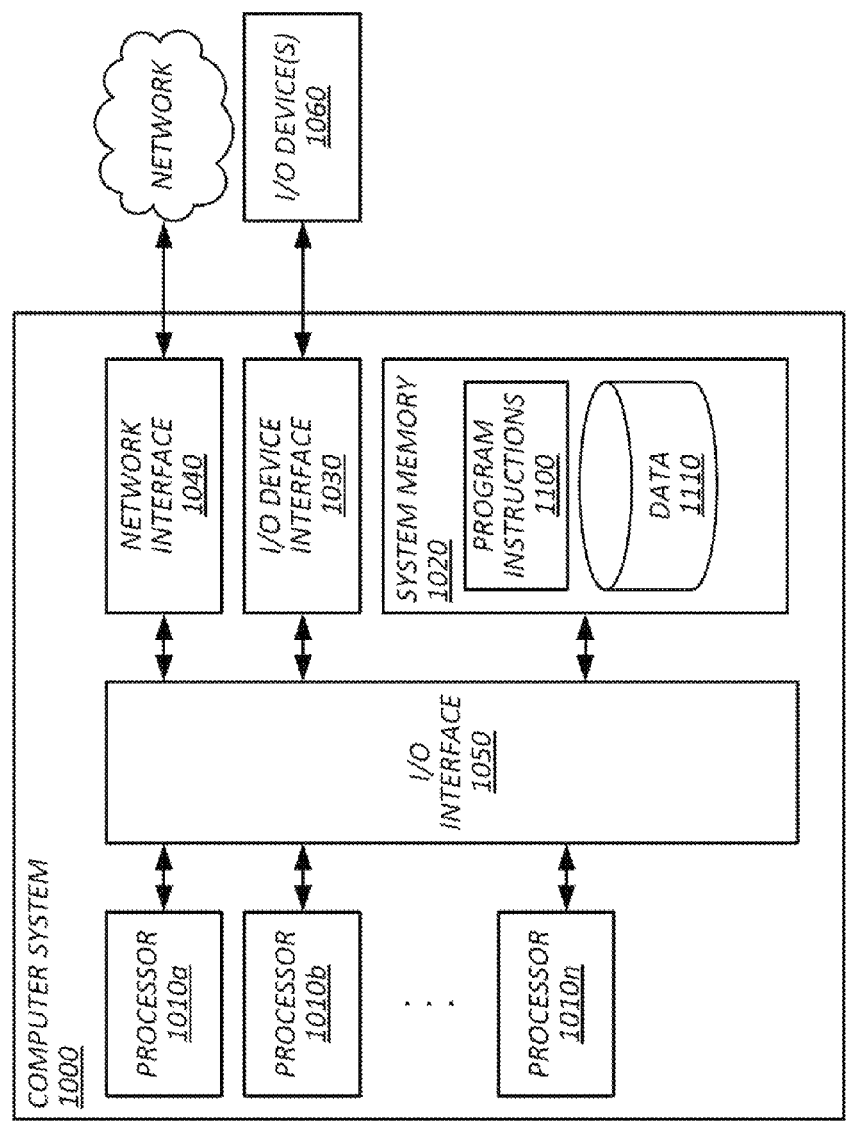
FIG. 7 shows an embodiment of a computer system in which the present techniques may be implemented.

FIG. 7 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010*a*-1010*n*) coupled to system memory 1020, an input/output I/O device interface 1030 and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010*a*), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on a remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area (WAN), a cellular communications network or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include, non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). In some embodiments, the program may be conveyed by a propagated signal, such as a carrier wave or digital signal conveying a stream of packets.

I/O interface 1050 may be configured to coordinate I/O traffic between processors 1010a-1010n, system memory 1020, network interface 1040, I/O devices 1060 and/or other peripheral devices. I/O interface 1050 may perform protocol, timing or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000, or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending or storing instructions or data implemented in accordance with the foregoing description upon a computer-accessible medium. Accordingly, the present invention may be practiced with other computer system configurations.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a", "an" and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms relating to causal relationships, e.g., "in response to," "upon," "when," and the like, encompass causal relationships having both causes that are a necessary causal condition and causes that are a sufficient causal condition, e.g., "state X occurs upon condition Y obtaining" is generic to "X occurs solely upon Y" and "X occurs upon Y and Z." Similarly, unless otherwise indicated, statements that one value or action is "based on" another condition or value encompass both instances in which the condition or value is the sole factor and instances in which the condition or value is one factor among a plurality of factors. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic processing/computing device. In the context of this specification, a special purpose computer or a similar special purpose electronic processing or computing device is capable of manipulating or transforming signals, for instance signals represented as physical electronic, optical, or magnetic quantities within memories, registers, or other information storage devices, transmission devices, or display devices of the special purpose computer or similar special purpose processing or computing device.

What is claimed is:

1. A method of spatially indexing geographic items, the method comprising:
receiving a geographic location;
receiving data describing a plurality of geographic items, including a location and an attribute for each of the plurality of geographic items;
calculating a plurality of attribute weighted distances between the geographic location and each of the plurality of geographic items, wherein the weighted distance for a given geographic item is based on the distance between the geographic location and the location of the geographic item weighted by the attribute of the geographic item;
selecting a geographic item from among the plurality of geographic items having the smallest calculated attribute weighted distance; and
indexing the selected geographic item by the geographic location in a spatial index.

2. The method of claim 1, further comprising:
determining that the selected geographic item is indexed to a plurality of geographic locations in a range of geographic locations; and
compressing the spatial index by storing an identifier of a member of the range of geographic locations and data indicative of a number of members in the range.

3. The method of claim 1, wherein the geographic location corresponds to a geographic area that is represented by a node in a tree data structure, the node having descendant nodes that represent portions of the geographic area.

4. The method of claim 3, further comprising:
indexing the geographic item to the geographic locations corresponding to all descendant nodes of the node corresponding to the geographic location based on a characteristic distance of the geographic area corresponding to the geographic location.

5. The method of claim 4, wherein indexing the geographic item to the geographic locations corresponding to all descendant nodes of the node corresponding to the geographic location further comprises:
determining a second smallest attribute weighted distance from among the plurality of attribute weighted distances;
determining a characteristic distance representative of a size of the geographic area;
determining a summed distance by adding the characteristic distance to the distance between the geographic location and the location of the geographic item;
determining a delta weighted distance by weighting the summed distance by the attribute of the geographic item;
determining whether the delta weighted distance is less than the second smallest attribute weighted distance; and
indexing the geographic item to the geographic locations corresponding to all descendant nodes of the node corresponding to the geographic location if the delta weighted distance is less than the second smallest attribute weighted distance.

6. The method of claim 1 wherein the geographic location is represented by a key identifier that is a member of a three-dimensional locality preserving curve.

7. The method of claim 6, wherein the three-dimensional locality preserving curve is a Hilbert curve or a Z-order curve.

8. The method of claim 1, wherein:
the geographic items are airports; and
the attributes are capacities of the airports.

9. The method of claim 1, wherein:
the geographic items are cities; and
the attributes are populations of the cities.

10. The method of claim 1, further comprising:
receiving a query for a nearest geographic item, the query identifying a reference location;
mapping the reference location to the geographic location;
retrieving the selected geographic item from the spatial index using the geographic location; and
returning the selected geographic item as the nearest geographic item to the reference location.

11. The method of claim 10, further comprising:
selecting the spatial index from among a plurality of spatial indexes based on keywords in the received query.

12. The method of claim 10, wherein mapping the reference location to the geographic location further comprises:
identifying the geographic location by performing a binary search of the spatial index using the reference location.

13. A system, comprising:
one or more processors;
one or more memories storing instructions that when executed by one or more of the processors cause the processors to perform steps comprising:
receiving a geographic location;
receiving data describing a plurality of geographic items, including a location and an attribute for each of the plurality of geographic items;
calculating a plurality of attribute weighted distances between the geographic location and each of the plurality of geographic items, wherein the weighted distance for a given geographic item is based on the distance between the geographic location and the location of the geographic item weighted by the attribute of the geographic item;
selecting a geographic item from among the plurality of geographic items having the smallest calculated attribute weighted distance; and
indexing the selected geographic item by the geographic location in a spatial index.

14. The system of claim 13, the steps further comprising:
determining that the selected geographic item is indexed to a plurality of geographic locations in a range of geographic locations; and
compressing the spatial index by storing an identifier of a member of the range of geographic locations and data indicative of a number of members in the range.

15. The system of claim 13, wherein the geographic location corresponds to a geographic area that is represented by a node in a tree data structure, the node having descendant nodes that represent portions of the geographic area.

16. The system of claim 15, the steps further comprising:
indexing the geographic item to the geographic locations corresponding to all descendant nodes of the node corresponding to the geographic location based on a characteristic distance of the geographic area corresponding to the geographic location.

17. The system of claim 16, wherein indexing the geographic item to the geographic locations corresponding to all descendant nodes of the node corresponding to the geographic location further comprises:
determining a second smallest attribute weighted distance from among the plurality of attribute weighted distances;
determining a characteristic distance representative of a size of the geographic area;
determining a summed distance by adding the characteristic distance to the distance between the geographic location and the location of the geographic item;
determining a delta weighted distance by weighting the summed distance by the attribute of the geographic item;
determining whether the delta weighted distance is less than the second smallest attribute weighted distance; and
indexing the geographic item to the geographic locations corresponding to all descendant nodes of the node corresponding to the geographic location if the delta weighted distance is less than the second smallest attribute weighted distance.

18. The system of claim 13, wherein the geographic location is represented by a key identifier that is a member of a three-dimensional locality preserving curve.

19. The system of claim 18, wherein the three-dimensional locality preserving curve is a Hilbert curve or a Z-order curve.

20. The system of claim 13, wherein:
the geographic items are airports; and
the attributes are capacities of the airports.

21. The system of claim 13, wherein:
the geographic items are cities; and
the attributes are populations of the cities.

22. The system of claim 13, the steps further comprising:
receiving a query for a nearest geographic item, the query identifying a reference location;
mapping the reference location to the geographic location;
retrieving the selected geographic item from the spatial index using the geographic location; and
returning the selected geographic item as the nearest geographic item to the reference location.

23. The system of claim 22, the steps further comprising:
selecting the spatial index from among a plurality of spatial indexes based on keywords in the received query.

24. The system of claim 22, wherein mapping the reference location to the geographic location further comprises:
identifying the geographic location by performing a binary search of the spatial index using the reference location.

* * * * *